Nov. 23, 1971  L. R. WALSTROM  3,621,552
PNEUMATIC WIRE STRINGING APPARATUS FOR CORE MEMORIES
Filed July 23, 1970  9 Sheets-Sheet 1

Fig 1

INVENTOR.
LESLIE R. WALSTROM
BY
Lew Schwartz
ATTORNEY

Nov. 23, 1971  L. R. WALSTROM  3,621,552
PNEUMATIC WIRE STRINGING APPARATUS FOR CORE MEMORIES
Filed July 23, 1970  9 Sheets-Sheet 2

INVENTOR.
LESLIE R. WALSTROM
BY Lew Schwartz
ATTORNEY

INVENTOR.
LESLIE R. WALSTROM
BY Lew Schwartz
ATTORNEY

INVENTOR.
LESLIE R. WALSTROM
BY Lew Schwartz
ATTORNEY

INVENTOR.
LESLIE R. WALSTROM
BY Lew Schwartz
ATTORNEY

United States Patent Office 3,621,552
Patented Nov. 23, 1971

3,621,552
PNEUMATIC WIRE STRINGING APPARATUS FOR CORE MEMORIES
Leslie R. Walstrom, Excelsior, Minn., assignor to Fabri-Tek Incorporated, Minneapolis, Minn.
Filed July 23, 1970, Ser. No. 57,725
Int. Cl. H05k 13/00
U.S. Cl. 29—203 MM  36 Claims

ABSTRACT OF THE DISCLOSURE

Pneumatic apparatus for stringing wires through a row or column of aligned toroidal magnetic cores, the apparatus including a pneumatic gun in the form of a plurality of tubular means, the tubular means having a plurality of pneumatic ports through which pneumatic pressure enters the gun, and the means by which wire to be strung is fed through the tubular means. Apparatus is provided for automatically positioning the gun adjacent to the cores to be strung, and then applying pneumatic pressure through the ports into the gun to force the wire directly through the row or column of cores to be strung. Apparatus is also provided for holding and cutting a strung wire, and indexing the core memory to an unstrung column or row.

BACKGROUND OF THE INVENTION

As is well known in the core memory art, it is necessary to string a plurality of flexible wires through the apertures in the toroidal magnetic cores used in such memories. The basic method for stringing the wires through the cores is manual, and for obvious reasons of eliminating human error and decreasing time, various methods have been tried for automating the insertion of the wires through the cores. One of the basic problems involved with automating core memory wire stringing is that whether the wire is hand fed or machine fed, and whether it is held stationary or vibrated or rotated to facilitate its passage through the cores, the wire is too flexible to maintain a consistent linear direction through the center of the apertures of the cores through which it is being passed. Therefore, the wire will often catch on one or more cores as a row or column of cores is being strung.

Attempts to overcome the last mentioned problem have included the use of "needles" to thread the wire through the cores. This method has the disadvantage of requiring the step of attaching the wire to the needle, and the further disadvantage that should the needle strike a core there is a highly increased chance of damage to the core.

The apparatus of this invention overcomes the above problem by providing a new means of propelling the flexible wire through the cores, which has the advantage of maintaining an accurate directional flow of the flexible wire.

SUMMARY OF THE INVENTION

Briefly described, this invention provides apparatus and method by which a pneutmatic blast both propels the wire through a core array and maintains accuracy in properly guiding the wire through the apertures in the row or column of toroidal cores. A tubular gun barrel is provided through which the wire is fed. A plurality of pneumatic jet ports are attached to the tubular barrel to provide a pneumatic blast in a direction designed to carry the wire through the tube and drive it through the magnetic core array. Means for snaring the wire after it has passed through the core array are also provided, along with means for holding and cutting the wire. The magnetic core array is held on an indexable chuck, which automatically aligns an unstrung row or column with the pneumatic gun following each stringing of a row or column.

In the drawings:
FIG. 11a is a sectional view of the apparatus of FIG. 11 taken along the line 11a—11a.

DESCRIPTION OF THE PREFERRED EMBODIMENT

Figure 1:
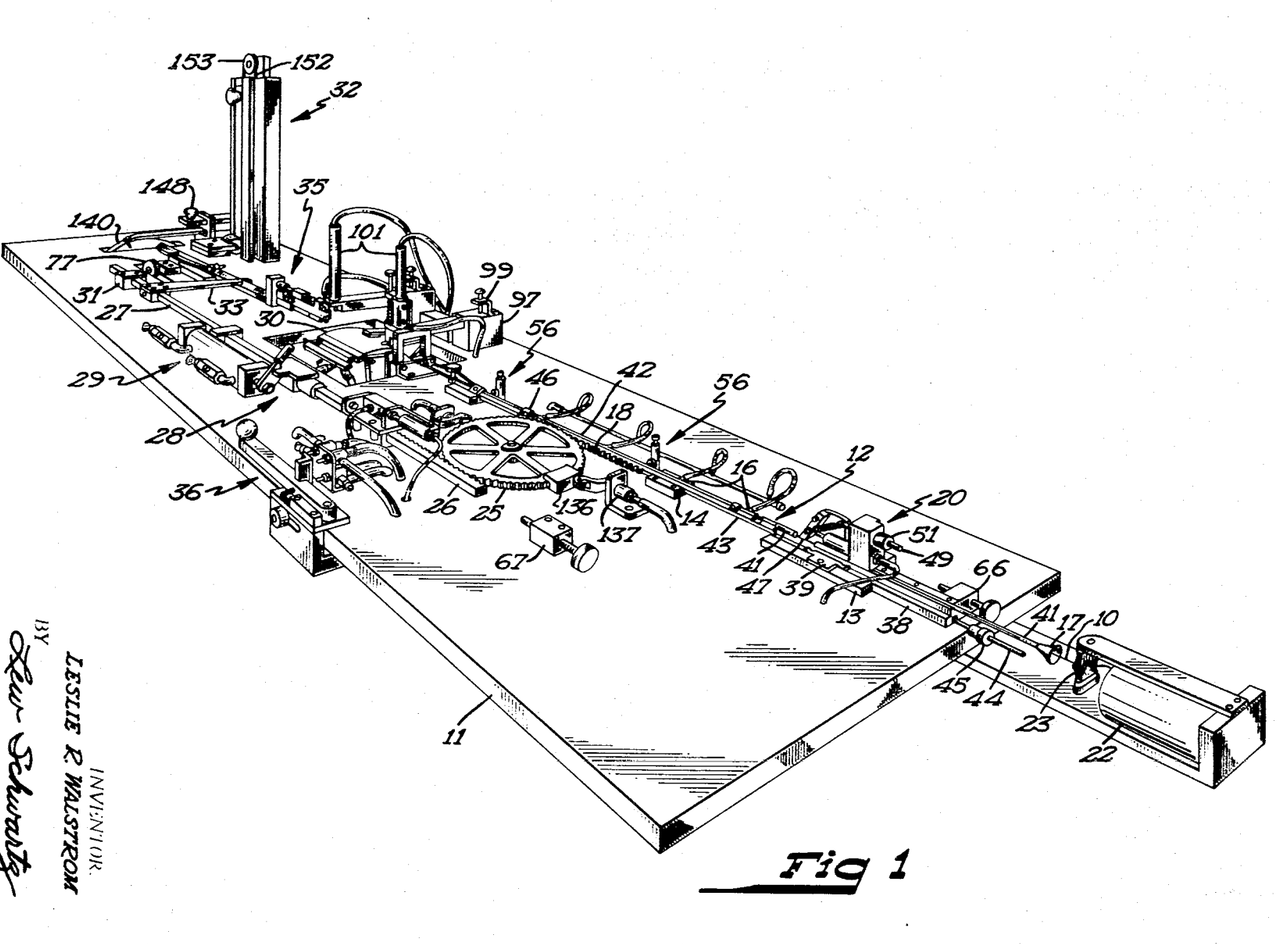
FIG. 1 is a perspective view of an embodiment of the wire stringing apparatus of this invention.

In FIG. 1 there is shown a work surface 11 on which is mounted a plurality of apparatus for the pneumatic stringing of wire 10. Certain apparatus is not visible because it is below work surface 11. Where necessary and appropriate, this apparatus is shown in other figures of the drawings. In FIG. 1 a wire gun 12, more fully described below, is shown mounted on a plurality of slider blocks 13, 14 and 15. A plurality of pneumatic ports 16 are shown connected to gun 12, the ports being connected to a pneumatic source. A sleeve 22 contains a cylindrical spool of wire 10, and in FIG. 1 wire 10 is shown as it is threaded from spool 22 into a flared end 17 of gun 12, after passing between a pair of brushes 23. A tension brake 20, more fully described below, is also shown mounted on block 13. A portion of gun 12 comprises a toothed rack 18 adapted to mate with teeth on a transfer wheel 25 mounted on an axis extending normal to surface 11 for rotation in a plane parallel to surface 11. Opposite from rack 18 across transfer gear 25 is another mating toothed rack 26, which comprises a portion of a slider bar 27. Bar 27 is mounted on a plurality of slider blocks 31 and is connected through a releasable connection mechanism 28 to a pneumatic actuating mechanism 29.

A transfer bar 33 is connected between slider bar 27 and a wire snare mechanism 35. An indexable chuck 30, here shown as a vacuum chuck, is provided for holding the magnetic core array to be strung. There is also shown an indexing mechanism 32, more fully described below, for automatic indexing of chuck 30. Also shown is a manual operation mechanism 36, by which an operator can commence each automatic phase of operation of the wire stringing apparatus, as more fully described below.

Figure 2:
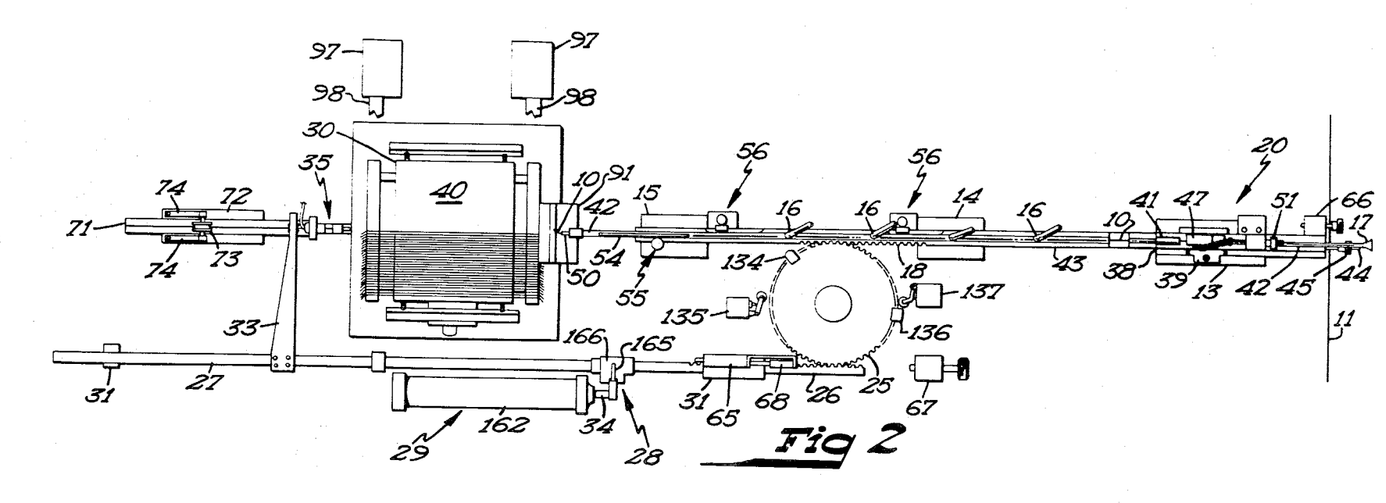
FIG. 2 is a top schematic view of the apparatus of FIG. 1 shown in its start position.
Figures 2A, 2B:
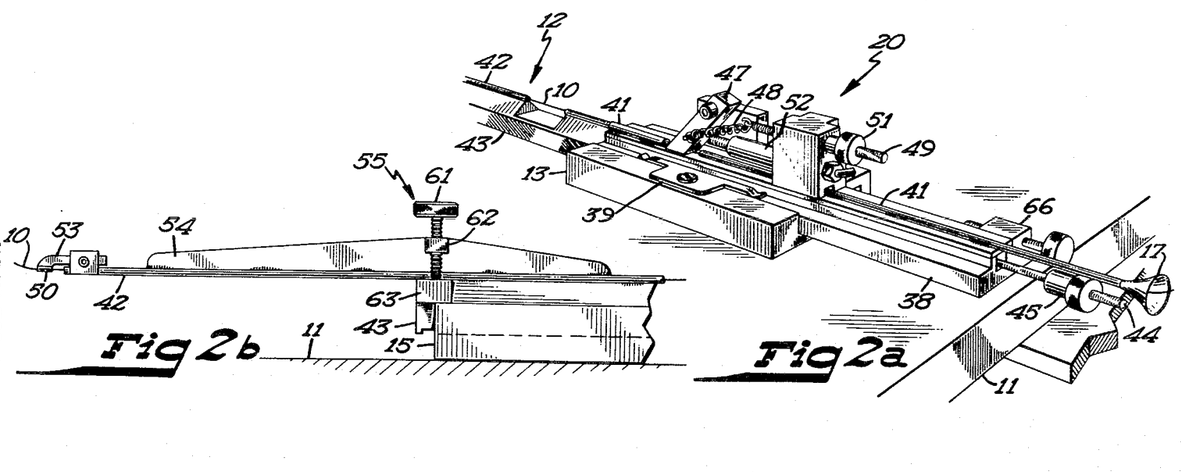
FIG. 2a is a perspective view of the loading end of the wire gun of the apparatus of FIG. 2, including tension brake apparatus.
FIG. 2b is a side plane view of the output end of the wire gun of the apparatus of FIG. 2.

Referring now to FIGS. 2, 2a and 2b, the start or neutral position of the apparatus of this invention will be described. FIG. 2 is a top view of the apparatus of FIG. 1, shown somewhat schematically for purposes of clarity. FIG. 2a is a detailed drawing of a portion of the apparatus of FIG. 2, including in particular tension brake apparatus 20. FIG. 2b shows the tip or exit end of gun 12.

Referring first to FIG. 2a there is shown a slider bar 38 mounted in slider block 13, and held in place by a spring clip 39. It can also be seen that wire gun 12 includes a tube 41 mounted on bar 38, which has a flared end portion 17 for ease of threading wire. Tube 41 is split for a predetermined distance to allow access to wire 10 threaded therethrough. Gun 12 also includes another slider bar 43 on which is mounted another tube 42, smaller than tube 41. Tube 42 is held on bar 43 by a set of clamps 46. Tubes 41 and 42 are aligned to comprise the "barrel" of gun 12 and tube 41 telescopes in a portion of tube 42. Tube 42 may also be split for wire threading purposes.

A threaded bar 44 is connected to slider bar 43 and extends through an aperture in bar 38. An adjustable stop knob 45 is provided on threaded bar 44 for purposes to be more fully described below.

Also mounted on bar 38 is tension brake 20, here shown to include a hinged member 47 yieldingly biased toward contact with wire 10 in the split portion of tube 41 by a spring 48. The tension of spring 48 can be adjusted by means of a threaded bar 49, to which spring 48 is attached, along with a threaded knob 51 on bar 49. There is also provided a pneumatic cylinder 52, here shown for the neutral or start position of the apparatus of this invention in its neutral or unextended position.

Referring now to FIG. 2b it is seen that the end of slider bar 43 closest to the array to be strung is mounted in slider block 15. Tube 42 extends a distance beyond bar 43, and is held in position by a blade-like member 44. A gun adjustment mechanism 45 is mounted on blade member 54, and will be more fully described below. It can also be seen in FIG. 2b that gun 12 terminates in yet a smaller tube 50 in spaced alignment with tube 42. Tube 50 is preferably a hypodermic tube, and is connected to tube 42 by apparatus including a knife blade thin member 53. Thin member 53 serves to avoid substantial deformation of the air stream coming out of tube 42.

It is important to note that in this neutral or start position, which is assumed to be the position following the successful stringing of a row or column of toroidal cores and just prior to the next stringing operation, a small portion of wire 10 extends beyond tip 50 of wire gun 12. Preferably the amount of wire 10 extending beyond gun 12 is less than one inch, but more importantly, as will be indicated below, it is preferable that none of wire 10 extend beyond tube 50.

Referring now to FIG. 2, it can be seen that actuation of the drive means 29, connected to slider bar 27 by mechanism 28, will cause bar 27 to move to the reader's right. The rack and pinion action of racks 26 and 18 with transfer gear 25 will cause slider bar 43 to move toward an array of magnetic cores 40 mounted on chuck 30. At the time, transfer bar 33 will cause wire snare mechanism 35 to also move toward array 40 on chuck 30. As slider bar 43 slides in slider boxes 14 and 15, it is held in position by roller mechanisms 56, more fully described below.

Figure 3:
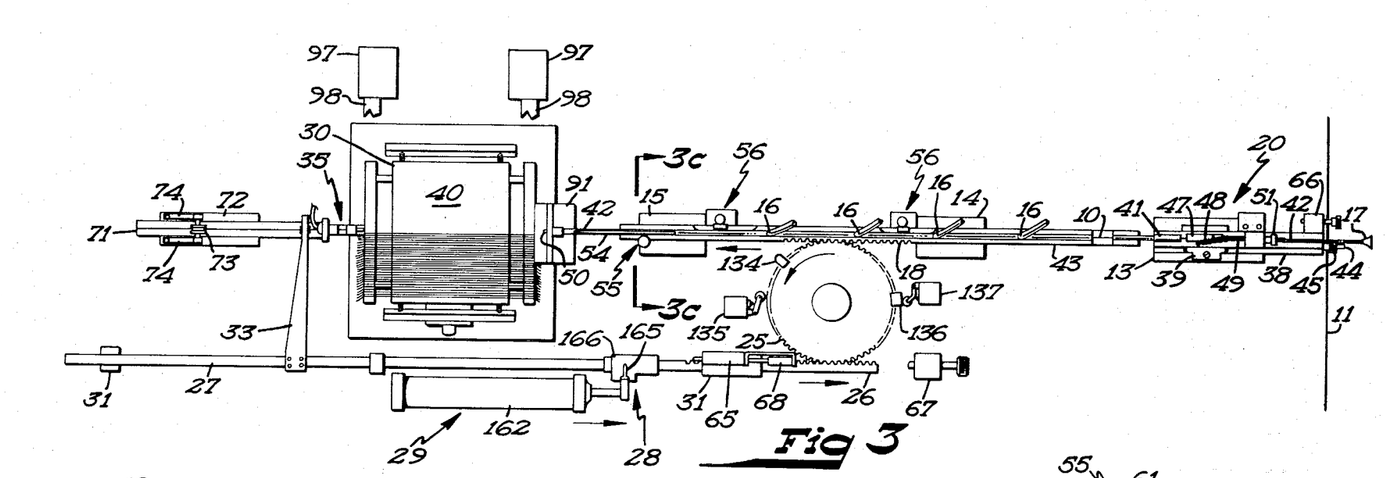
FIG. 3 is a view similar to FIG. 2, with the apparatus in a stage of motion toward its wire firing position.
Figures 3A, 3B, 3C:
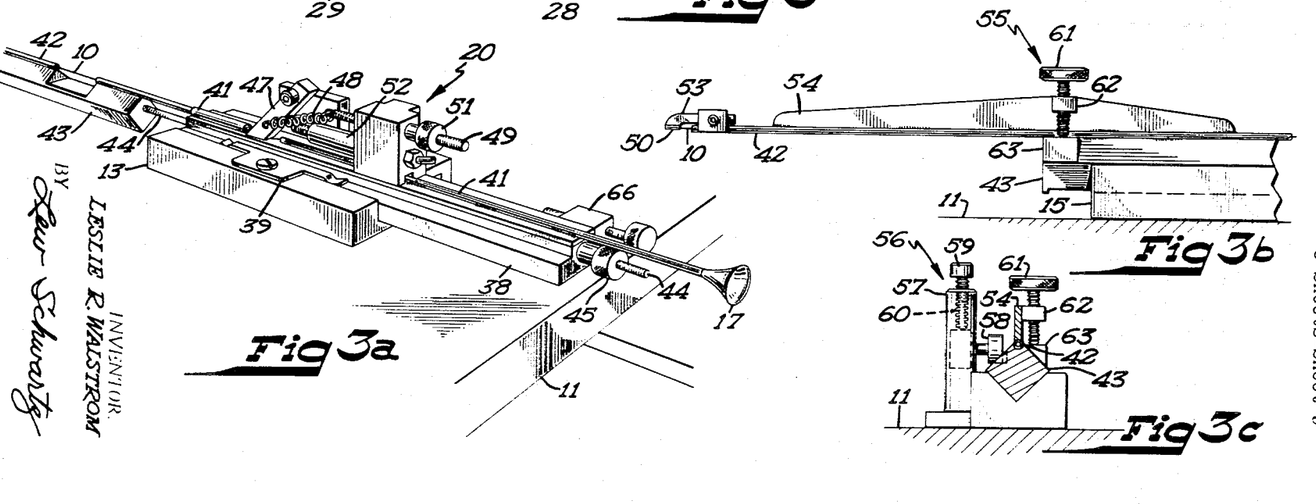
FIG. 3a is a perspective view similar to FIG. 2a with the apparatus in the position shown in FIG. 3.
FIG. 3b is a side plane view similar to FIG. 2b with the apparatus in the position shown in FIG. 3.
FIG. 3c is a sectional view taken along the lines 3c—3c of FIG. 3 showing the wire gun roller mechanism, and adjustment mechanism for the output end of the roller gun.

Referring now to FIGS. 3, 3a and 3b, this series of drawings indicates the position of the apparatus of this invention during initial motion. Motion is commenced by the operator applying pressure to the lever of manual operation mechanism 36 in a selected manner. This activates pneumatic actuating mechanism 29, causing the extension of an arm 34. Through connection mechanism 28, the motion of arm 34 is transmitted to slider bar 27 which in turn applies a rightward movement to rack 26. Transfer gear 25 is therefore caused to rotate counterclockwise with respect to the viewer, at the same time interacting with rack 18 to cause a leftward movement of slider bar 43 of gun 12.

As stated above, it is desirable that the small portion of wire 10 extending from hypodermic tube 50 be eliminated or withdrawn into gun 12 prior to stringing further cores. The initial motion period described above accomplishes this in a manner which can best be seen by reference to FIGS. 2a and 3a. In FIG. 2a it can be seen that in the start position knob 45 is spaced a predetermined amount away from slider bar 38 on threaded bar 44. Therefore, the initial motion of slider bar 43 will take place without motion of slider bar 38, and as hinged member 47 of tension brake 20 is applying pressure to wire 10, wire 10 will be held in position as slider bar 43 and hypodermic tube 50 move toward chuck 30. This motion will cause the extending portion of wire 10, as seen in FIG. 2b, to be retracted into hypodermic tube 50, as shown in FIG. 3b. Adjustable stop knob 45 may be properly adjusted to allow for a motion sufficient to take into tube 50 the extending wire 10.

After knob 45 comes in contact with slider bar 38, it will be carried forward due to the continued motion of bar 43 as transfer gear 25 continues to be rotated. As tension brake 20 is still on, further wire 10 will be dragged from the spool in sleeve 22, and the position of wire 10 relative to the barrel of gun 12 will remain stationary. This second phase of the motion is intended to bring hypodermic tubing 50 adjacent to a row or column of toroidal cores on magnetic matrix 40 carried by chuck 30.

During the motion of gun 12, as can be seen in FIG. 3c, roller mechanism 56 keeps rectangular slider bar 43 in position in a mating triangular notch in slider block 15. As can be seen in FIG. 3c, roller mechanisms 56 comprise a housing 57 in which there is mounted a roller 58 held in place by a bolt 59 and a spring 60. Roller 58 rides along a groove cut in the side of bar 43, shown in phantom in FIG. 3c.

Also shown in FIG. 3c is a fine vertical adjustment for the barrel of gun 12. Gun adjustment mechanism 55 comprises a bolt 61 threaded through a threaded nut 62 rigidly connected to blade-like member 54. Bolt 61 presses on a projection 63 mounted on bar 43. In operation, as bolt 61 is tightened a loosened through nut 62 to exert or release pressure on projection 63, the force will be felt on blade-like member 54 to slightly raise or lower tube 42, and thus raise or lower hypodermic tube 50.

Finally, it will be noted that the rightward movement of slider bar 27 will be transmitted directly to transfer bar 33 to move snare mechanism 35 into position adjacent to the other end of the core row or column of cores.

Figures 4, 4A, 4B:
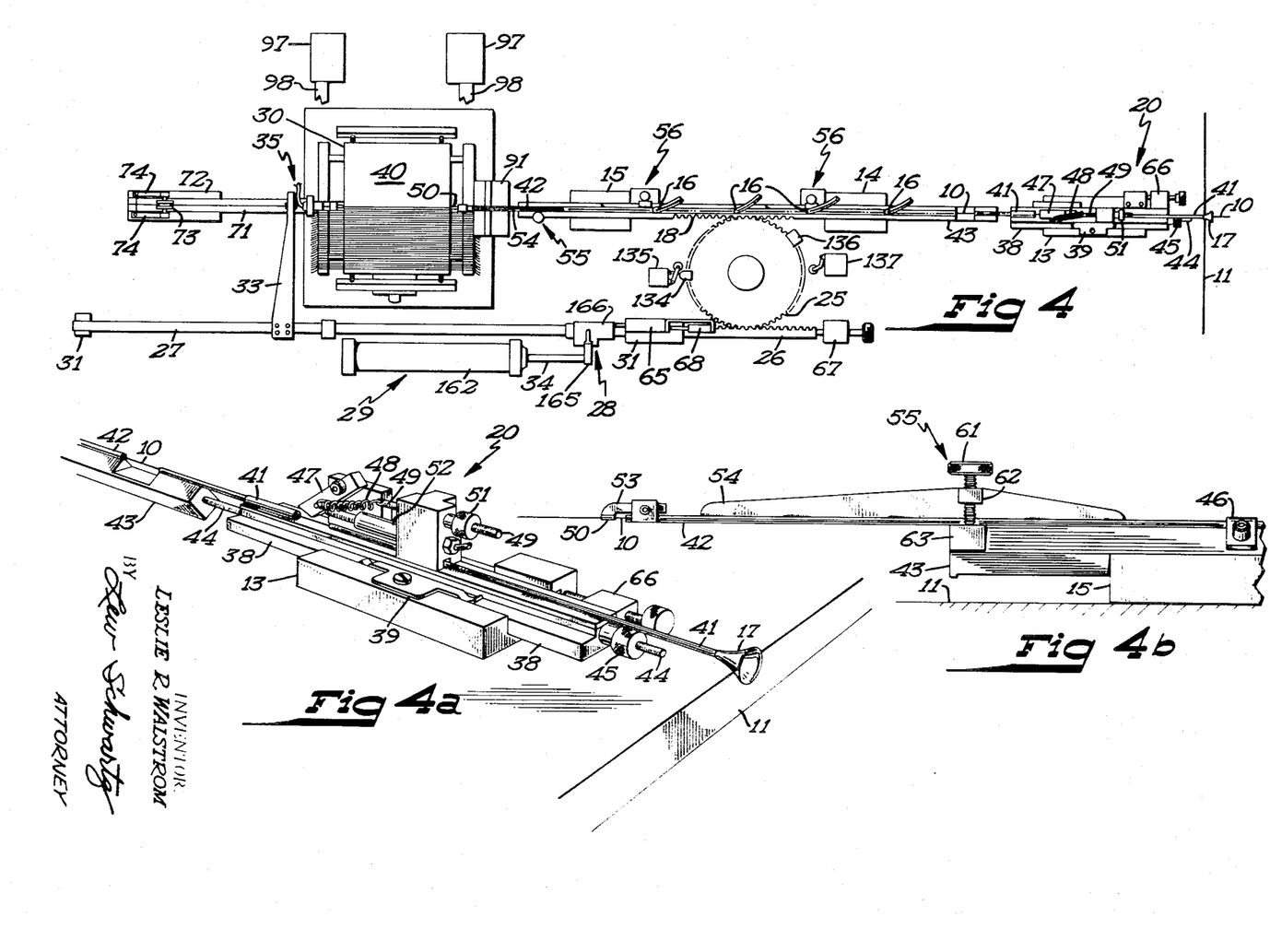
FIG. 4 is a view similar to FIG. 2 with the apparatus shown in its wire firing position.
FIG. 4a is a perspective view similar to FIG. 2a with the apparatus shown in the firing position.
FIG. 4b is a side plane view similar to FIG. 2b with the apparatus shown in the firing position.

Referring now to FIGS. 4, 4a and 4b the apparatus of the invention is shown in its firing position. In FIGS. 4 and 4a it can be seen that slider bar 38 has been slid sufficiently through block 13 so that an adjustable stop 66 has made contact with block 13, thus preventing further movement of bar 38. At the same time, rack 26 will hit a stop 67 to prevent further movement of gun 12 and snare mechanism 35. Thus stop 66 prevents bar 38 from coasting after gun 12 has been stopped, to prevent an undesired force on wire 10.

At the time rack 26 hits stop 67, a portion of connection mechanism 28 will actuate a double acting pneumatic valve 65. Double acting valve 65 will lower the snare of snare mechanism 35, in a manner more fully described below.

With the motion stopped, and the apparatus in position for stringing, the operator may then actuate the lever of manual operation mechanism 36 to fire wire 10 through a row or column of toroidal cores on matrix 40. This selected operation first acts to release tension brake 20 by actuating cylinder 52 which will force hinged member 47 away from wire 10 against the tension of spring 48, and hold it there during the firing operation. Finally, a pneumatic apparatus (not shown) will be actuated to provide pneumatic blasts into tube 42 at ports 16. This blast of air will carry wire 10 through the barrel of gun 12 and out hypodermic tube 50, and direct it through the row or column of cores where it will be stopped by snare mechanism 35 in a manner described below.

Through the exact scientific principles are not known at this time, the described embodiment has been built and tested, and it is apparent that the pneumatic blast will not only force wire 10 through the barrel of gun 12, but will continue to direct its passage through the cores in an accurate, substantially linear direction, despite flexibility of the wire. It is this principle which provides one of the primary advantages of the apparatus of this invention.

As stated above, hypodermic tube 50 is connected to tube 42 by a knife thin member 53 so as not to unnecessarily block the pneumatic flow from tube 42. Also, it is to be noted that a plurality of pneumatic ports 16 are preferable to a single port. Four ports have been used during actual testing of the embodiment shown, and have been found highly preferable to the use of one or two ports. Reference to FIG. 4b will indicate how, in approaching the firing position, bar 43 has slid through block 15 to its left-most position thus carrying hypodermic tube 50 to a position adjacent to the cores to be strung. In FIG. 4b, wire 10 is shown as it is fired from the end of gun 12.

As stated before, the embodiment described herein has been built and tested and found to be successful. In the tested embodiment, tube 42 comprised a length of hollow tubing of 0.040 inch inside diameter, through which there was slid a copper wire of 0.0035 inch outside diameter. It was found that four ports such as 16 were sufficient to pull wire 10 from a spool in sleeve 22 and propel it in a leftward direction at speeds estimated at about 200 inches per second. During experimentation and actual use of the apparatus shown in the embodiment described herein, it was found that despite the speed with which the wire 10 is propelled by the pneumatic blast, when the end of the wire struck any obstruction it would stop without "piling up," that is, without continuing to come out of the entrance of the gun and without bending or twisting. Finally, it has been found to be preferable to close down the loading end of the gun 12, that is, the last open end of tube 42 behind one of ports 16, to about twice the diameter of the wire being fed to prevent a loss of velocity caused by a loss of the pneumatic movement through the back end of tube 42.

During experimentation it was found that the 0.040 inch I.D. of tube 42 was too great compared to the 0.0035 inch O.D. of wire 10 to provide the desired "shooting" accuracy at the output end of gun 12. Therefore, hypodermic-needle tube 50 was provided, having an I.D. of 0.008 inch, which resulted in a highly accurate path for wire 10 through a row or column of cores.

Figure 5:
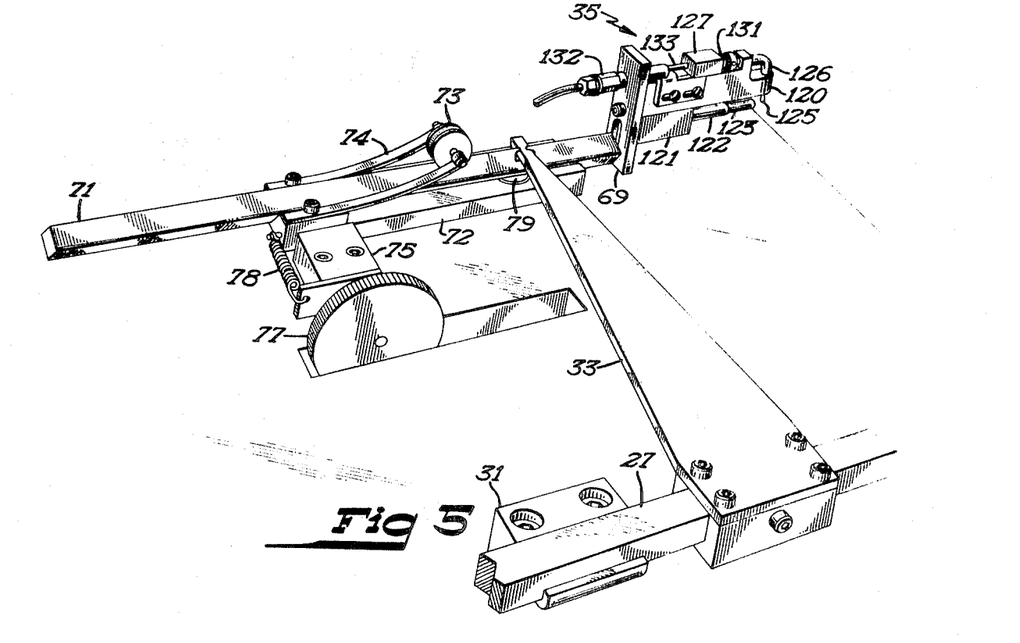
FIG. 5 is a perspective view of a portion of the apparatus of FIG. 1 showing means for moving and adjusting the wire snare mechanism of this invention.
Figures 5A, 5B:
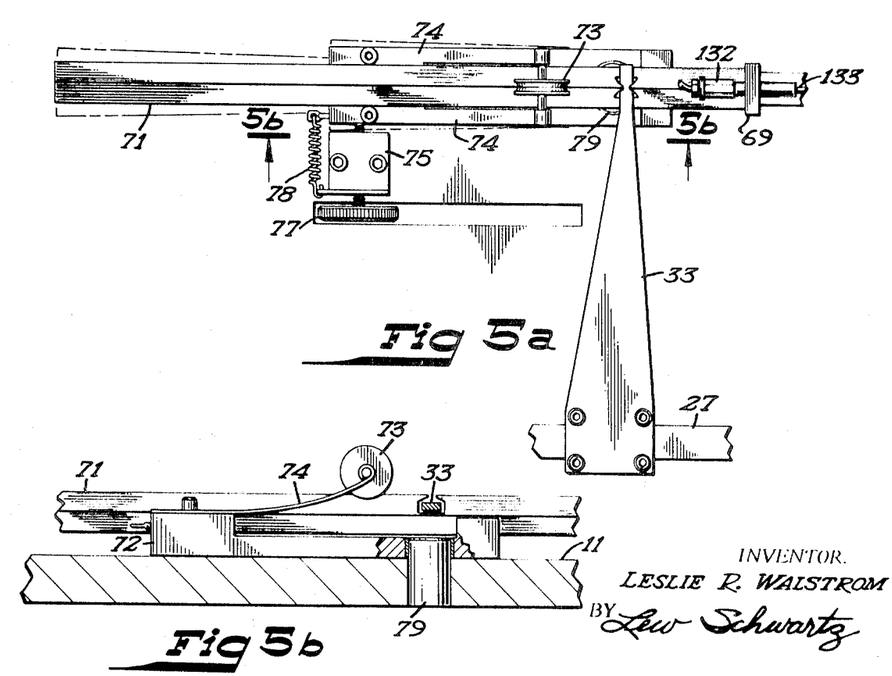
FIG. 5a is a partial top plane view of the apparatus of FIG. 5 showing in phantom the limits of adjustment provided by the apparatus of FIG. 5.
FIG. 5b is a section of FIG. 5a taken along the line 5b—5b.

For an understanding of the operation concerning the position of wire snare mechanism 35, reference is made to FIGS. 5, 5a and 5b. There it can be seen that snare mechanism 35 is mounted on a slotted plate 69. Plate 69 is connected to slider bar 71, and the slot in plate 69 allows for adjustment of snare mechanism 35 in a direction normal to work surface 11. Slider bar 71 is here shown as being rectangular in shape and mounted in a V-shaped slot in a slider block 72. Bar 71 is held in place in block 72 by a roller 73 which is connected to block 72 by a pair of leaf springs 74, which springs 74 cause roller 73 to press rectangular bar 71 into the V-shaped groove in block 72 without restricting horizontal movement of bar 71.

Reference to FIGS. 5, 5a and 5b indicates that there is a slot cut in bar 71 which receives the narrowed tip of transfer bar 33 in such a manner that there is free movement between transfer bar 33 and slider bar 71 except in a direction parallel to the longitudinal axis of bar 71. This provides for accurate positioning of snare mechanism 35 without removing transfer bar 33 from bar 71.

There is also shown a block 75 rigidly mounted to surface 11, and a bolt 76 which extends through a threaded aperture in block 75 to contact block 72. Bolt 76 has an enlarged head 77 for ease of mnaual movement. In the apparatus of this embodiment head 77 is shown as extending into a slot provided in work surface 11. A spring 78 yieldingly biases block 72 toward block 75. As shown in the partial section in FIG. 5b, block 72 is pivotally mounted on surface 11 by means of a pivot 79, providing for rotation of block 72 in a plane parallel to work surface 11. Adjustment of snare mechanism 35 is accomplished by tightening or loosening bolt 76. The extreme positions of block 72 resulting from turning bolt 76 in either direction are shown in phantom in FIG. 5a.

Figure 6:
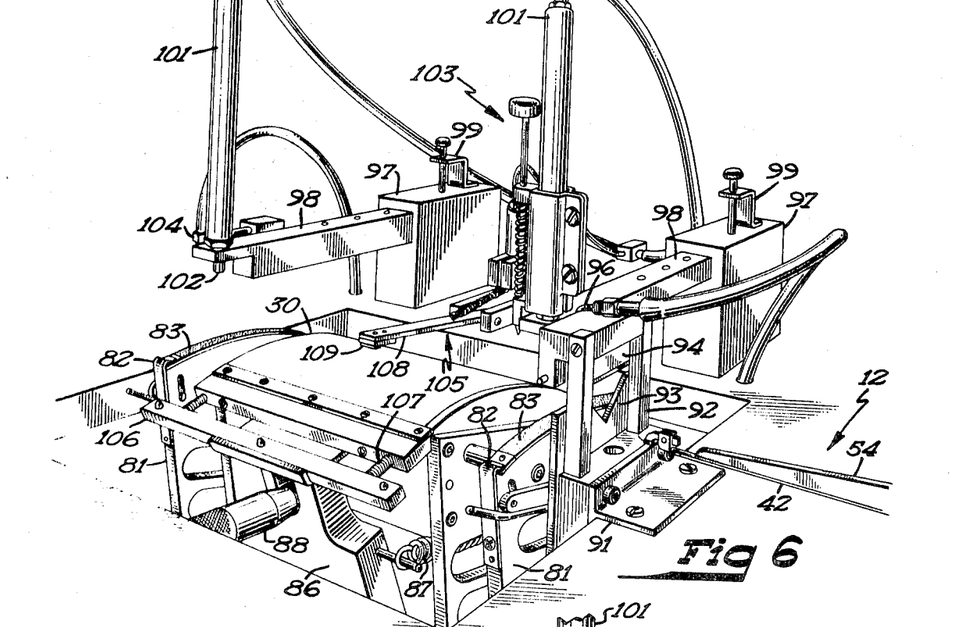
FIG. 6 is a perspective view of the chuck apparatus of the embodiment of FIG. 1, including associated apparatus.

Referring now to FIG. 6 it can be seen that curved chuck 30 is mounted (by means not shown) to extend through an aperture in work surface 11. Chuck 30 is indexable in the direction of its curvature by mechanism to be described below. The indexing of chuck 30 is for moving an unstrung row or column of toroidal cores of a core matrix mounted on chuck 30 into alignment with core gun 12.

A pair of plates 81 are connected one to each side of chuck 30, each of plates 81 having an upper surface curved substantially the same as the curved surface of chuck 30, and mounted to be below the upper surface of chuck 30. Each of plates 81 includes a pair of latch members 82 for holding a tape-like member 83 on the upper surface of each of plates 81. Preferably members 83 each have a sticky surface for receiving and holding strung wires.

A plate 86 is shown toward which chuck 30 is yieldingly biased by a spring 87. A micrometer mechanism 88 is connected to plate 86 and can be adjusted to contact chuck 30 to force it away from plate 86 against the spring tension of spring 87. The mechanism of members 86, 87 and 88 provides a fine adjustment for indexable chuck 30 in its direction of indexing.

A bracket 91 connects a frame 92 to work surface 11 adjacent to chuck 30. Frame 92 holds a V-shaped groove through which the firing end of gun 12 reciprocates as it moves from its neutral to its firing position and back again. Frame 92 also holds a guillotine mechanism 94 which is actuated to cut wire 10 in cooperation with V-shaped groove member 93 after gun 12 has pulled away from chuck 30 subsequent to firing wire 10 through a row or column of cores. Gillotine 94 is pneumatically actuated, as is a blower tube 96 also mounted on frame 92 for blowing the cut end of the wire 10 remaining attached to the sticky surface of member 83 downwardly and out of the path of possible interference with the next reciprocation of gun 12.

Also mounted on surface 11 are a pair of blocks 97 each carrying a slideable tamper arm 98 and a pin mechanism 99 for cooperating with apertures in slideable tamper arms 98 to lock it in a selected position. Mounted on each of arms 98 is a pneumatically operated tamper cylinder 101, each having a tamper piston 102. The position of the respective tamper cylinder 101 can be slideably adjusted by means of pin mechanism 99, block 97 and apertures in sliding tamper arms 98. Thus tamper cylinders 101 can be removed from above chuck 30 when a magnetic core memory matrix is being attached to chuck 30. A spring loaded alignment mechanism 103 is attached to at least one of tamper cylinders 101 to provide, for example, accurate realignment to insert a wire which has been accidentally missed. The operation of tamper cylinders 101 and pistons 102 will be more fully described below. Another blower tube 104 is connected to tamper valve 101 on the opposite side of chuck 30 from blower tube 96.

A gap filler mechanism is also shown in FIG. 6, for providing a tubular path for the fired wire 10 in gaps between cores, which gaps occur, for example, on core matrices which have a quadrature wiring scheme. These gaps will be well known to those familiar with the core memory art. The specific structure and operation of gap filler mechanism 105 will be more fully described below.

Finally, with respect to FIG. 6, a bar 106 is shown yieldingly biased away from chuck 30 by a pair of springs 107. Bar 106 is adapted to receive one of, for example, numbers 83 carrying wires which have already been strung through the core array. When the array is rotated to be strung in the row or column direction, the member 83 which is easily removed by actuation of latch 82, is provided with apertures that catch on the pins shown in bar 106. By manually pushing bar 106 against springs 107 prior to attaching the member 83, a light spring tension can be put on the strung wires to prevent interweaving with the new wires being strung. This mechanism and the disadvantages of interweaving will be more fully described below.

Figures 7, 8:
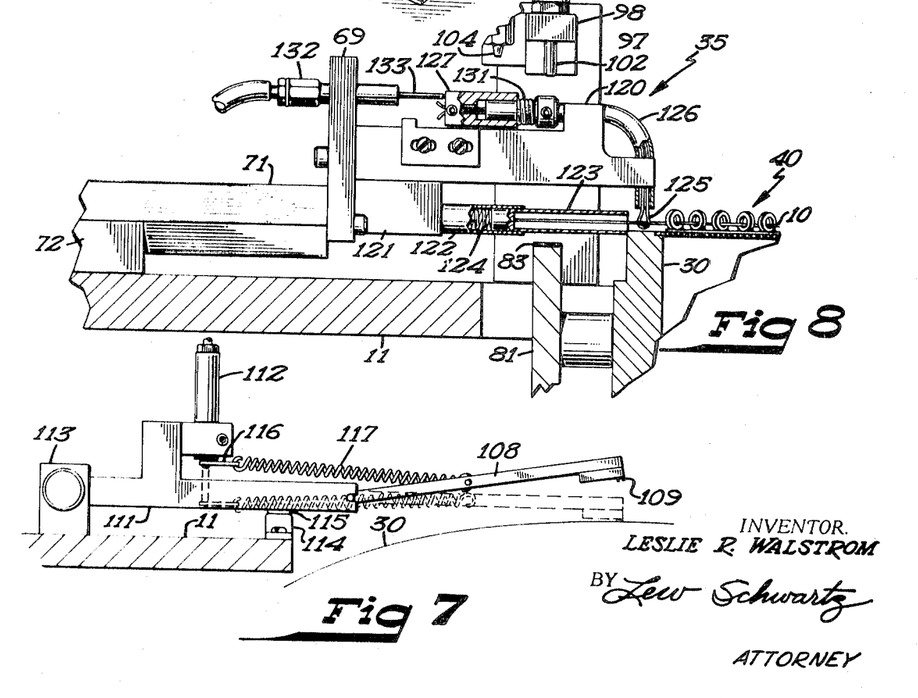
FIG. 7 is a side plane view of that portion of FIG. 6 comprising a gap filler mechanism.
FIG. 8 is a side plane view of the snare mechanism of the embodiment of FIG. 1 shown in position immediately following the firing or stringing of a row or column of cores.

Referring now to FIG. 7, there is shown gap filler mechanism 105. It can be seen that an arm 108 is connected to a channel 109, which channel 109 is used to fill gaps between cores on matrices such as four quadrature matrices. Arm 108 is pivotally mounted to a bar 111, which in turn is pivotally mounted to support structure 113 rigidly connected to surface 11. A magnet 114 is also connected to surface 11 to contact a magnetizable member 115 connected to bar 111, for securing bar 111 in the downward position. A pneumatic cylinder 12 is mounted on bar 111 and has its piston connected to a plate 116. A spring 117 is connected between plate 116 and arm 108. When cylinder 112 is not actuated and plate 116 is in the position shown in solid lines in FIG. 7, the bias of spring 117 is such as to rotate arm 108 upward to remove channel 109 from the surface of chuck 30. Arm 108 must be raised to allow channel 109 to clear strung wires, and brought down again to guide the next wire. When cylinder 112 is actuated its piston extends as shown in phantom in FIG. 7, to move plate 116, spring 117 and arm 108 to the positions shown in phantom in FIG. 7. It is apparent from the phantom portion of FIG. 7 that when plate 116 is lowered, the bias of spring 116 is such as to cause arm 108 to be lowered to the surface of chuck 30.

Referring now to FIGS. 8, 8a, 8b and 8c the structure and operation of snare mechanism 35 will be discussed. In FIG. 8, snare mechanism 35 is shown in position immediately following the firing of wire 10 through a row or column of core on a memory matrix 40. As explained above, the rightward motion of slider bar 27 was transmitted through transfer bar 33 to slider bar 71, thus causing snare mechanism 35 to approach its wire receiving position during the firing position of gun 12.

It can be seen that snare mechanism 35 includes a pair of support members 120 and 121 connected to slotted plate 69, which as described above is adjustly mounted to slider bar 71. A tube 122 is rigidly connected to support member 121, and has mounted for telescoping therein another tube 123. A spring 124 yieldingly biases tube 123 in a direction out of tube 122. A snare comprising a loop of wire 125 extends through another tube 126 and is connected to a slider member 127 slideably connected to tube 126. A slotted block 128 is adjustably connected to member 120 by a pair of bolts 129. Tube 126 is rigidly mounted to support member 120 and slideably mounted within an aperture in slider member 127. A spring 131 is mounted around tube 126 and has one end rigidly connected to tube 126 with the other end in contact with slider member 127 to yieldingly bias member 127 to the reader's left. There is also shown mounted on block 69 a pneumatic cylinder 132 having a piston 133.

In FIG. 8, as described above, snare mechanism 35 has been carried to its wire receiving position and has received fired wire 10. It is noted that tube 123 has actually come in contact with chuck 30 and has been slightly telescoped against spring 124 into tube 122. As described above, when slider arm 27 was moved sufficiently to the right, it carried connection mechanism 28 into contact with double acting valve 65. Double acting valve 65 causes pneumatic pressure to actuate cylinder 132 thus extending piston 133 against slider member 127. Slider member 127 moves rightward against spring 131. This movement of slider member 127 causes snare 125 to be lowered, as shown in FIG. 8, and to be in position to receive wire 10. As can be seen, wire 10 has been fired, and has passed through the cores on matrix 40, through snare 125, and into tube 123. Tube 123 has a closed end which acts as a stop for wire 10.

Figure 8A:
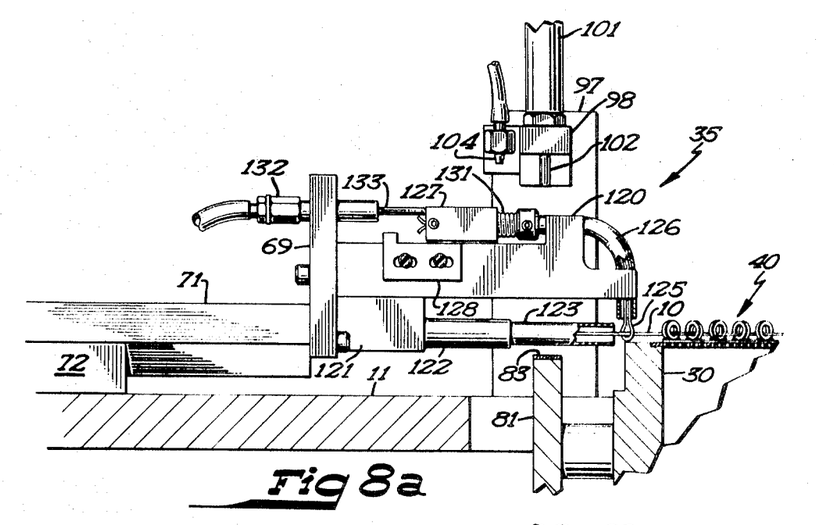
FIGS. 8a, 8b, and 8c are side plane views of the wire snare mechanism of FIG. 8 showing the movement and action of the snare mechanism as it acts on a wire strung by the apparatus of FIG. 1.

Referring to FIG. 8a, there is shown the position of snare mechanism 35 after the operator has actuated mechanism 36 to cause gun 12 and mechanism 35 to withdraw from chuck 30. It is to be recognized that at this time the wire 10 which has just been strung through the cores of matrix 40 still extends from the spool in sleeve 22 to its end position in tube 123. FIG. 8a indicates the initial portion of the leftward or return motion of snare mechanism 35. It is important to note that snare 125 is still down, and has not yet been actuated to snare wire 10. This is necessary because an attempt to snare wire 10 at this point, too close to matrix 40, may cause such an upward angle of wire 10 as to dislodge certain of the cores on matrix 40. Therefore, snare 125 is kept in the downward position for the initial portion of the leftward movement of snare mechanism 35. This is accomplished through double acting valve 65 which maintains cylinder 132 in the on position even after connection mechanism 28 is no longer in contact with valve 65. Thus, snare 125 is carried away from matrix 40 prior to snaring wire 10.

Figure 8B:
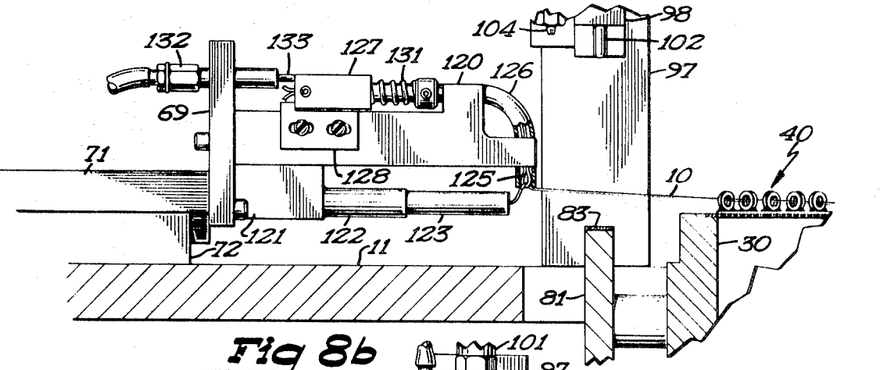

Referring now to FIG. 8b, there has been sufficient return movement of snare mechanism 35 so that snare 125 has been actuated. Snare 125 is actuated by boss 134 on transfer gear 25 actuating valve 135. The actuation of valve 135 causes a pneumatic cylinder 68 to deactuate double acting valve 65 and thus to deactuate cylinder 132. Following the deactuation of cylinder 132, spring 131 slides member 127 to its rightward limit determined by a projecting stop member on plate 128. This leftward movement of member 127 draws snare 125 into tube 123, carrying and gently holding wire 10 with it. This snaring of wire 10 prevents the rightward movement of gun 12, which is simultaneous with the leftward movement of snare mechanism 35, from pulling wire 10 out of the cores of matrix 40 or otherwise causing wire bending or tangling.

Figure 8C:
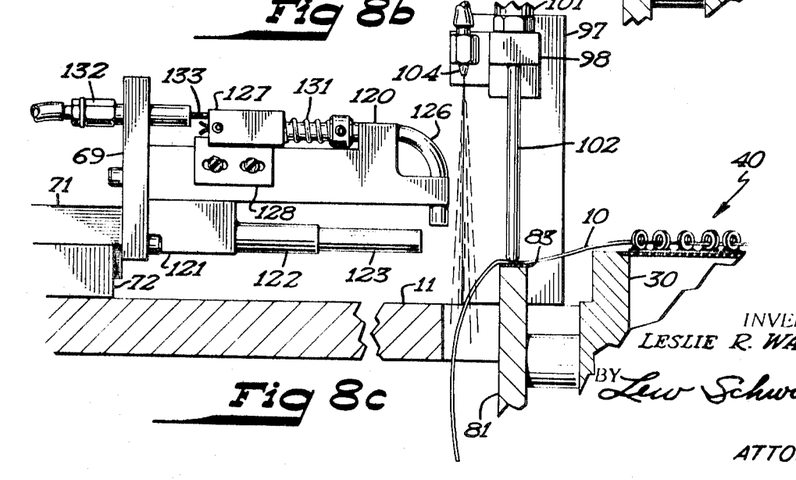

Referring now to FIG. 8c it can be seen that snare mechanism 35 has moved sufficiently to the right so that there has been a corresponding clockwise motion of transfer gear 25, which has caused boss 136 to actuate a valve 137. The actuation of valve 137 in turn actuates tamper cylinder 101 causing the momentary extension of tamper pistons 102. As seen in FIG. 8c, tampers 102 have been actuated to push wire 10 against the sticky surface of members 83 on plates 81. This action of tamper pistons 102 holding wire 10 against sticky surfaces 83, in combination with the continued leftward motion of snare mechanism 35, causes wire 10 to be pulled from the light grasp of snare 125.

Following the tamping of wire 10, gun 12 and snare mechanism 35 will continue to move until they have reached the start position described above. At this time the operator actuates operation mechanism 36 to cut wire 10 and blow loose wire ends out of the way. The cutting is done by the action of guillotine 94 sliding against V-groove 93. The blowing is accomplished by pneumatic blasts through tubes 96 and 104, as indicated by the dotted lines in FIG. 8c.

Also at this time, chuck 30 is indexed to bring an unstrung row or column of cores into position for the next stringing operation of the apparatus of this invention. The indexing of chuck 30 in this preferred embodiment is accomplished by the apparatus shown schematically in FIGS. 9 and 9a. Chuck 30 is connected to a shaft 139 which is in turn connected to a transfer wheel 140. A counterweight 141 is connected by a cord 142 to the outer periphery of transfer wheel 140 to counterbalance wheel 140 in a clockwise direction. A metal strap 143 is connected to and rides on the periphery of wheel 140. Strap 143 is also connected to a ratchet follower assembly 145. A cord 144 is connected between wheel 140 and ratchet follower assembler 145, around a pulley 146. Cord 144 is attached to provide a "continuous belt drive" between wheel 140 and ratchet follower 145. A pneumatic cylinder 147 is mounted on ratchet follower assembly 145 for automatic operation of the indexing mechanism, while a handle 148 is provided on ratchet follower assembly 145 for manual operation of the indexing mechanism 32. Ratchet follower assembly 145 is mounted to cooperate with a triangular ratchet 150 in the form of a vertically extending plate having teeth along a slanted edge. A counterweight 151 is connected by a cord 152 to ratchet 150 over a pulley 153, to provide an upward force to ratchet 150.

Figures 9, 9A, 10, 10A, 10B:
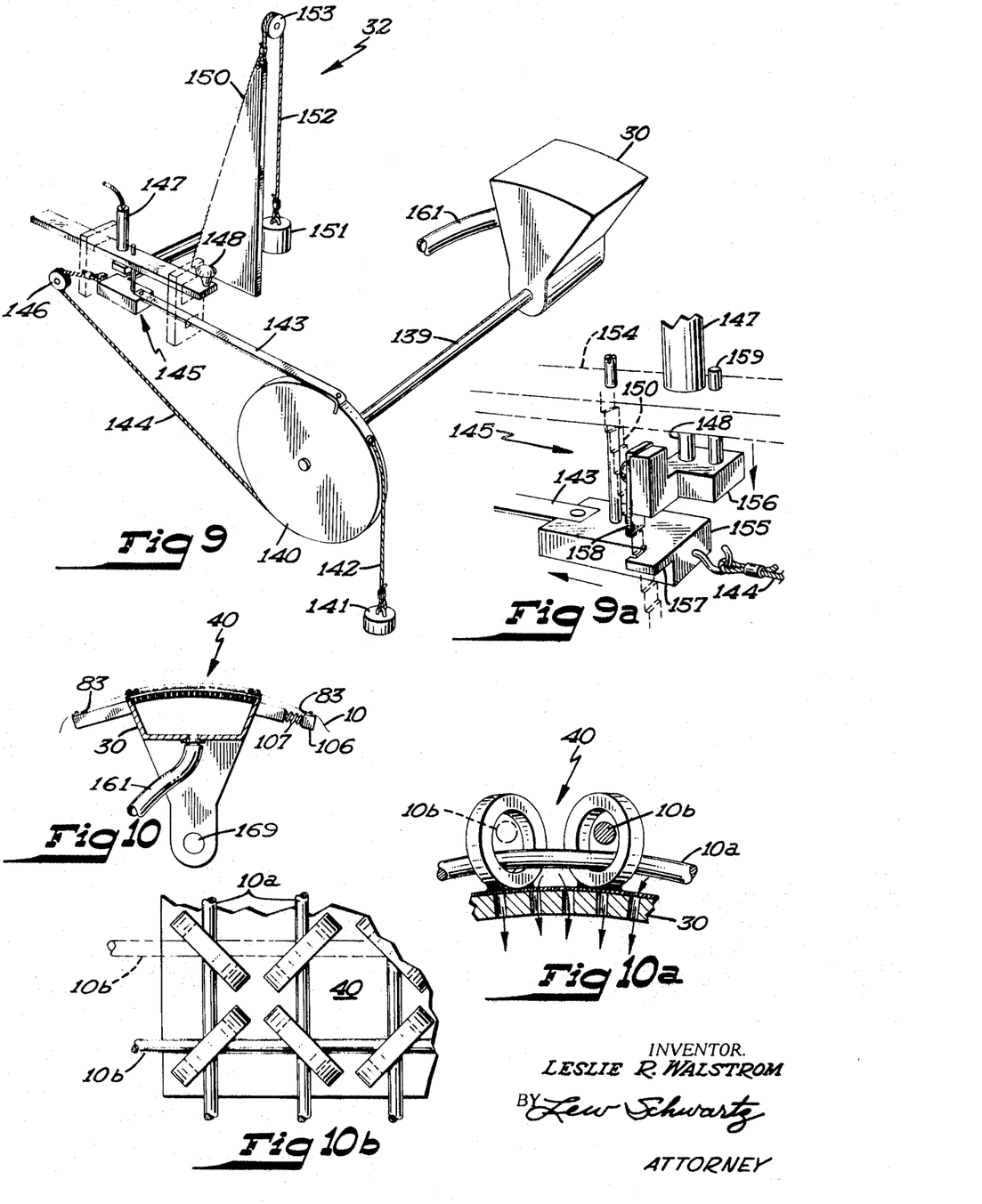
FIGS. 9 and 9a are perspective views of the chuck indexing mechanism of the apparatus of FIG. 1, shown in partial schematic form.
FIG. 10 is a side plane sectional view of a portion of the chuck apparatus of the apparatus of FIG. 1 showing the vacuum chamber and surface vacuum apertures of the chuck.
FIG. 10a is a perspective view of a pair of adjacent cores on a core matrix mounted on the chuck apparatus of this invention, indicating the manner in which wires are strung and are to be strung through the cores.
FIG. 10b is a top plane view of a plurality of cores on a memory matrix, the apertures of the cores shown in phantom, showing how the X and Y drive wires of the matrix are strung and are to be strung.

In FIG. 9a it can be seen that ratchet follower assembly 145 includes a plate 154 (shown in phantom) which carries a cylinder 147. There is also provided a pair of blocks 155 and 156, block 155 having a grooved portion 157 for mating with the teeth of ratchet 150 (shown in phantom in FIG. 9a) and block 156 having a flat member 158 for cooperating with the teeth of ratchet 150. Members 157 and 158 cooperate to form a pawl for ratchet 150. Piston 148 of cylinder 147 is connected to block 156 as is a pin 159. Pin 159 extends through an aperture in plate 154, to prevent undesired rotation of assembly 145.

In automatic operation, following the tamping of wire 10 as described above, cylinder 147 will be actuated so that piston 148 applies a downward force to block 156. This downward force is transmitted through member 158 to ratchet 150 forcing it downward, and thus allowing groove member 157 to slip forward, in the direction of the arrow, on the downwardly moving tooth. Piston 148 is then released and raises block 156 so that flat member 158 snaps back into another tooth of ratchet 150 for the next indexing operation. The forward movement of plate 155 is transmitted through strap 143 and the counterweight of weight 141 to allow a small turn of transfer wheel 140, which in turn rotates shaft 39 to move chuck 30. The "endless belt assembly" described above maintains wheel 140 in step with ratchet follower 145.

If desired, mechanism 32 can be manually reset by pushing laterally on handle 148 to move members 157 and 158 out of contact with ratchet 150. Ratchet 150 is manually pushed down and mechanism 145 is returned to contact with it to commence indexing again.

Referring now to FIGS. 10, 10a and 10b, it is shown that chuck 30 is preferably, though not necessarily, a vacuum chuck having a vacuum chamber connected to a vacuum hose 161 and having a plurality of apertures in its upper curved surface on which a core matrix 40 is mounted. It can also be seen that by mounting at least one of strung members 83 on a member such as 106, spring loaded by springs 107 as described above, the strung wires 10 can be held tightly adjacent the bottom of the apertures of the cores on matrix 40. FIG. 10a is a small section of FIG. 10 showing a pair of cores of matrix 40. The arrows indicate the direction of the vacuum holding matrix 40 on chuck 30. The tension on the strung wires 10, due to spring loaded member 106 and the curvature of the surface of chuck 30, holds them at the bottom of the aperture in the cores so that the further stringing of wires such as 10b (unstrung wire 10b is shown in phantom) can be strung without interweaving with strung wires 10a. It has been found by those skilled in the art to be undesirable to have interweaving between the wires in a magnetic core matrix. Such interweaving causes electrical disadvantages of the memory matrix. Further, by holding strung wires 10a in the lower portion of the apertures of the cores of matrix 40, the greatest space and thus the greatest accuracy is provided for the stringing of wires 10b.

Figure 11:
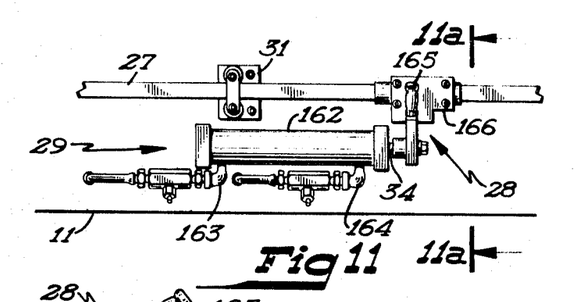
FIG. 11 is a top plane view of a portion of the apparatus of FIG. 1 showing the drive mechanism and the mechanism releasably connecting the drive mechanism to the apparatus to be driven.
Figure 11A:
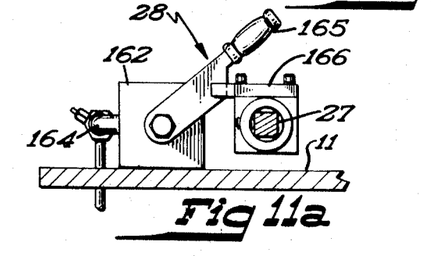

Referring now to FIGS. 11 and 11a, it can be seen that pneumatic actuating means 29 includes a cylinder 162 which actuates piston 34. A pair of connections 163 and 164 go to pneumatic sources (not shown) for driving piston 34 out of and into cylinder 162. Releasable connection mechanism 28 includes a hinged handle 165 mounted on piston 34 and adapted to cooperate with a slot in a connection mount 166 rigidly mounted to slider bar 27. If lever 165 is in position in the slot provided in mount 166, the outward and inward motion of piston 34 will drive slider bar 27 held in slider blocks such as 31. If it is desired to manually slide bar 27, or to replace cylinder 162, hinge lever 165 may be removed from the slot in mount 166.

Figure 12:
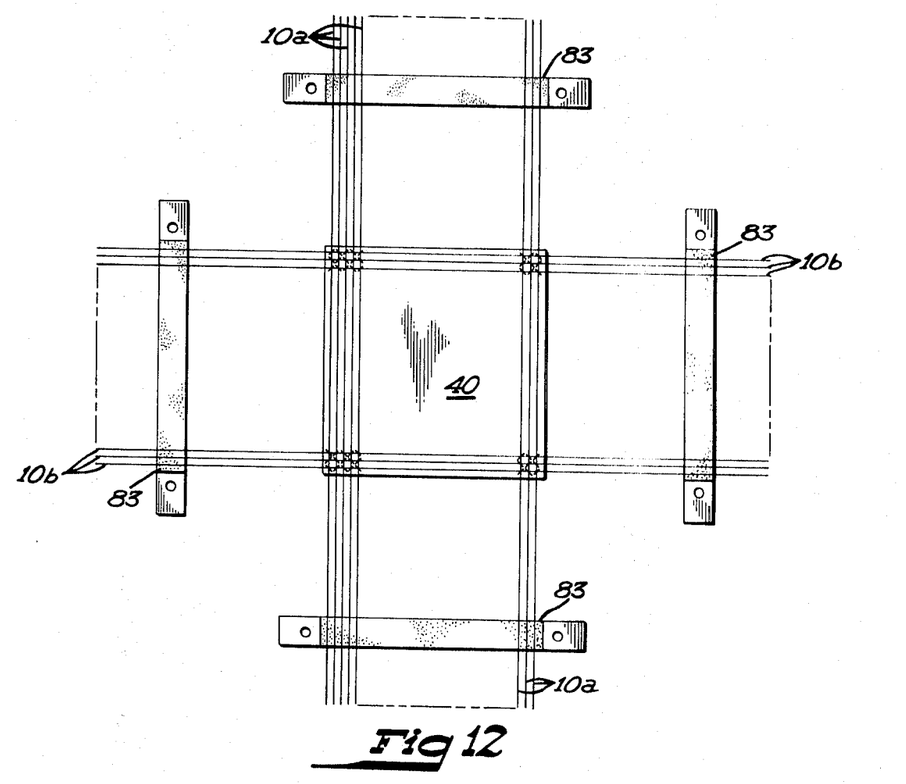
FIG. 12 is a top plane schematic view of a magnetic core memory matrix wired by the method and apparatus of this invention.

FIG. 12 is a top schematicized view of the final product produced by the apparatus and method of this invention. Matrix 40 has been completely strung with X and Y wires, the ends of the wires being held by a plurality of sticky members 83. If desired, members 83 can cooperate with other members to "sandwich" the wires in the strung matrix.

Certain other features of the apparatus of this invention should be recognized. For example, sleeve 22 preferably has a radius of about one-quarter inch greater than the radius of the wire spool it contains, to prevent excess loops of wire from slipping off the spool due to inertia of the wire itself when the propulsive pneumatic blast is turned off. Further control of wire 10 is provided by camel's hair brushes 23 mounted between sleeve 22 and flared end 17 of gun 12. Brushes 23 exert sufficient drag on wire 10 to prevent kinks from forming during fast starts and stops, and additionally help to straighten curvature caused by wire 10 having been on a spool. Still further in connection with the feeding and straightening of wire 10, it should be noted that following the firing phase described above, tension brake 20 is again actuated to apply a slight tension to wire 10. Thus tension brake 20 serves to provide a slight drag on wire 10 as it is pulled through the system by snare mechanism 35 in the manner described above, to have a straightening effect on wire 10.

From the embodiment described above it is apparent that this invention provides novel means and method for stringing toroidal cores in a memory matrix. The means described herein is but the preferred embodiment, which has been built and tested, and other embodiments may be used without departing from the spirit of this invention.

I claim:

1. Wire handling apparatus comprising: tubular means; said tubular means having a first open end for receiving wire and a second open end for expelling the wire; pneumatic port means connected to said tubular means and for connection to a source of pneumatic energy; and said port means constructed and arranged to direct a pneumatic blast to force the wire through said second open end of said tubular means.

2. The apparatus of claim 1 including: further tubular means aligned with said second open end so that wire expelled through said open end will be forced through said further tubular means; and the inside diameter of said further tubular means being less than the inside diameter of said tubular means, for improved guiding of wire passing therethrough.

3. The apparatus of claim 2 in which: said further tubular means is mounted in spaced relation to said tubular means.

4. The apparatus of claim 3 in which said further tubular means is connected to said tubular means by a thin member aligned to avoid interfering with a pneumatic flow from said second open end of said tubular means.

5. The apparatus of claim 1 including: movable means; mounting said tubular means to said movable means; and control means for controlling the movement of said movable means, for selectively moving said second open end of said tubular means toward and from means adapted to receive wire.

6. The apparatus of claim 5 including: controllable brake means mounted adjacent the path of wire passing through said tubular means; and said brake means being controllable for selectively applying tension to the wire.

7. The apparatus of claim 6 in which said control means is connected to control said brake means, for synchronizing movement of said tubular means with actuation of said brake means.

8. The apparatus of claim 6 in which: said brake means is movably mounted; and said brake means is connected to said movable means so that said brake means moves during a portion of the movement of said tubular means.

9. The apparatus of claim 5 including: controllable wire snare means for selectively snaring wire forced out of said second open end of said tubular means.

10. The apparatus of claim 9 in which: said snare means is movably mounted; and said snare means is connected to said movable means for synchronous movement of said snare means and said tubular means toward and from said means adapted to receive wire.

11. The apparatus of claim 9 in which: said snare means is connected to said control means for synchronizing control of said snare means with the movement of said snare means and said tubular means.

12. Wire stringing apparatus for magnetic core memories comprising: chuck means for holding an array of toroidal cores arranged in columns and rows; pneumatic wire gun means for firing wire through a row or column of the cores; means mounting said wire gun means for reciprocal movement thereof with respect to said chuck means; and control means for controlling the movement and firing of said wire gun means.

13. The apparatus of claim 12 including: wire snare means selectively operable to grasp wire fired through a row or column of the cores; means mounting said snare means for reciprocal movement thereof with respect to said chuck means; and said control means connected to control the movement and operation of said snare means.

14. The apparatus of claim 12 including: wire brake means selectively operable to apply tension to the wire; and said control means connected to control the operation of said brake means.

15. The apparatus of claim 14 including: means movably mounting said brake means; and means connecting said brake means to said means mounting said wire gun means for moving said brake means at least a portion of the time said gun means is moving.

16. The apparatus of claim 12 in which said wire gun means comprises: tubular means having input and output ends and adapted to have wire strung therethrough; pneumatic port means mounted on said tubular means and for connection to a pneumatic source; said port means constructed and arranged to pneumatically force wire through and out of said tubular means.

17. The apparatus of claim 16 in which: said tubular means output end has an inside diameter less than the inside diameter of said tubular means.

18. The apparatus of claim 16 including: further tubular means mounted in spaced relation to and in longitudinal alignment with said tubular means; and said further tubular means having an inside diameter less than the inside diameter of said tubular means.

19. The apparatus of claim 18 in which: said further tubular means is mounted to said tubular means by thin blade-like mounting means aligned to present a minimum surface in the path of a pneumatic flow from said output end of said tubular means.

20. The apparatus of claim 16 in which: said input end of said tubular means is closed down to an inside diameter less than the inside diameter of said tubular means.

21. The apparatus of claim 13 in which said wire snare means comprises: loop means movably mounted in loop channel means; loop actuator means for selectively extending and retracting said loop means; and said loop means and said loop actuator means mounted on said means mounting said snare means for reciprocal movement, for bringing said loop means to a position adjacent to said chuck means and in the path of wire fired from said wire gun means.

22. The apparatus of claim 21 including: wire stop means mounted on said means mounting said snare means, for stopping travel of fired wire after the wire has passed through said loop means.

23. The apparatus of claim 22 including: plate means adjustably mounted on said means mounting said snare means; means mounting said loop channel means, said loop means, said loop actuator means and said wire stop means on said plate means, for simultaneous reciprocation thereof with respect to said chuck means.

24. The apparatus of claim 23 in which: said loop actuator means includes pneumatically operated means connected to said control means.

25. The apparatus of claim 13 including: drive means connected to said means mounting said wire gun means and said means mounting said snare means for synchronous reciprocation thereof with respect to said chuck means; and said drive means connected to said control means.

26. The apparatus of claim 25 including: means for cutting wire; means for holding fired wire; means for placing fired wire on said means for holding fired wire; and at least said means for placing fired wire connected to said drive means for synchronizing the actuation thereof with the reciprocation of said wire gun means and said snare means.

27. The apparatus of claim 25 including: means connected to said drive means and said wire snare means for synchronizing the operation thereof with the reciprocation of said wire gun means and said snare means.

28. The apparatus of claim 14 in which said wire brake means comprises: lever means; means yieldingly biasing said lever means toward the wire; and brake release means selectively operable to force said lever means away from said wire.

29. The apparatus of claim 28 in which said brake release means comprises: pneumatically operated means connected to said control means.

30. The apparatus of claim 12 in which: said chuck means includes a curved surface for holding an array of toroidal magnetic cores, said surface curving in a direction transverse to the reciprocal movement between said chuck means and said gun means.

31. The apparatus of claim 30 in which: said chuck means includes means for holding wires strung through the cores in the rows and columns of said array; and said means for holding wires including means for placing tension on held wires, for keeping strung wires adjacent an edge of the aperture in strung cores.

32. The apparatus of claim 30 in which: said chuck means curved surface includes a plurality of apertures; and said curved surface is connected to vacuum means, for holding the array of magnetic cores on said surface.

33. The apparatus of claim 12 including: rachet means; said rachet means connected to said chuck means for indexing said chuck means in a direction transverse to the reciprocal movement between said chuck means and said wire gun means; and said rachet means connected to said control means.

34. Wire guiding apparatus comprising: chuck means for holding apparatus to be strung with wire; wire gun means for pneumatically guiding wire through the apparatus to be strung; wire snare means for at least temporarily grasping wire guided through the apparatus to be strung; and all said means connected to drive means for providing relative movement therebetween.

35. The apparatus of claim 34 including: wire brake means mounted in operable relation to the wire; and said brake means selectively operable to apply tension to the wire.

36. The apparatus of claim 34 in which: said wire gun means and said wire snare means are mounted on opposite sides of said chuck means and are simultaneously driven toward or from said chuck means in synchronization by said drive means.

References Cited
UNITED STATES PATENTS 3,529,341    9/1970    Bardo __________ 29—203 MM THOMAS H. EAGER, Primary Examiner

PO-1050
(5/69)

UNITED STATES PATENT OFFICE
CERTIFICATE OF CORRECTION

Patent No. 3,621,552            Dated November 23, 1971

Inventor(s) Leslie R. Walstrom

It is certified that error appears in the above-identified patent and that said Letters Patent are hereby corrected as shown below:

Column 4, line 24, after "the" and before "time" insert --same--.
Column 5, line 8, "a" should be --or--.
Column 5, line 47, "Through" should be --Though--.

Column 6, line 23, "position" should be --positioning--.
Column 6, line 47, "mnaual" should be --manual--.
Column 7, line 16, "Gillotine" should be --Guillotine--.
Column 7, line 51, "numbers" should be --members--.
Column 7, line 71, "12" should be --112--.
Column 8, line 16, "core" should be --cores--.
Column 10, line 61, "iti s" should be --it is--.
Column 11, line 32, after "said" insert --second--.
Column 11, line 45, before "mounting" insert --means--.

Signed and sealed this 23rd day of May 1972.

(SEAL)
Attest:

EDWARD M.FLETCHER,JR.           ROBERT GOTTSCHALK
Attesting Officer                  Commissioner of Patents